United States Patent [19]
Hsu

[11] Patent Number: 5,399,370
[45] Date of Patent: Mar. 21, 1995

[54] METHOD AND APPARATUS FOR TREATING GROUND ROASTED COFFEE

[75] Inventor: Sheng H. Hsu, Marysville, Ohio

[73] Assignee: Nestec S.A., Vevey, Switzerland

[21] Appl. No.: 57,905

[22] Filed: May 7, 1993

[51] Int. Cl.6 .............................................. A23F 5/26
[52] U.S. Cl. ..................... 426/432; 426/534; 426/506; 426/507; 99/289 R; 99/536
[58] Field of Search ............. 99/289 R, 536; 426/432, 426/434, 507, 506

[56] References Cited

U.S. PATENT DOCUMENTS

| | | | |
|---|---|---|---|
| Re. 27,841 | 12/1973 | Niven et al. | 99/71 |
| 1,849,187 | 8/1932 | Haines . | |
| 2,629,663 | 2/1953 | Fogler et al. | 99/71 |
| 3,549,380 | 12/1970 | Patel et al. | 99/71 |
| 3,857,332 | 12/1974 | Houghton-Larsen et al. | 426/432 |
| 4,091,457 | 5/1978 | Slywka | 366/304 |
| 4,100,305 | 7/1978 | Gregg | 426/385 |
| 4,100,306 | 7/1978 | Gregg et al. | 426/386 |
| 4,379,172 | 4/1983 | Liu | 426/386 |
| 4,606,921 | 8/1986 | Liu | 426/386 |
| 4,701,333 | 10/1987 | Margolis et al. | 426/432 |
| 5,066,388 | 11/1991 | Ross | 209/170 |

FOREIGN PATENT DOCUMENTS

398453  9/1933  United Kingdom .

Primary Examiner—Joseph Golian

[57] ABSTRACT

A method and apparatus for the continuous countercurrent treatment of roast and ground coffee particles in which a bed of the coffee particles is suspended in an aqueous liquid and the suspended bed is agitated in a manner which facilitates removal of evolved coffee gases from the bed to thereby effect complete, uniform wetting and/or extraction of the coffee grounds. The apparatus comprises a tank in which water flows upward from the bottom and is removed from the top of the tank, with fresh coffee grounds being fed onto the liquid at the top of the tank. Two pairs of interleaved blade assemblies are mounted in the tank for relatively counter rotation to submerge coffee particles into the aqueous liquid and form a bed of suspended coffee particles. A submerging auger, mounted on a central shaft in the tank, facilitates submerging the coffee grounds in the liquid. Both pairs of blade assemblies, which are arranged one above the other, have a set of downwardly extending blade members and an opposed set of upwardly extending blade members interleaved with the downwardly extending blades. One of the sets of blade members in each pair is stationary and the other set of blade members is mounted for rotation on the central shaft. Rotation of the rotatable set of blade members through the suspended bed removes evolved coffee gases from the surface of the coffee particles and creates dynamic vertical channels in the suspended bed of coffee particles permitting the escape of evolved coffee gases and providing paths for wetted coffee particles to settle through the suspended bed. A screw conveyor is mounted on the side of the tank at the base of the suspended bed at a desired to remove grounds from the base of the suspended bed and thereby control the height of the bed in the tank. Coffee grounds which settle to the bottom of the tank are removed by suitable means. The operation of the tank may be controlled to fully and uniformly wet coffee particles which are recovered for use in a coffee extraction operation, or to also extract soluble solids from the coffee particles in the tank.

9 Claims, 2 Drawing Sheets

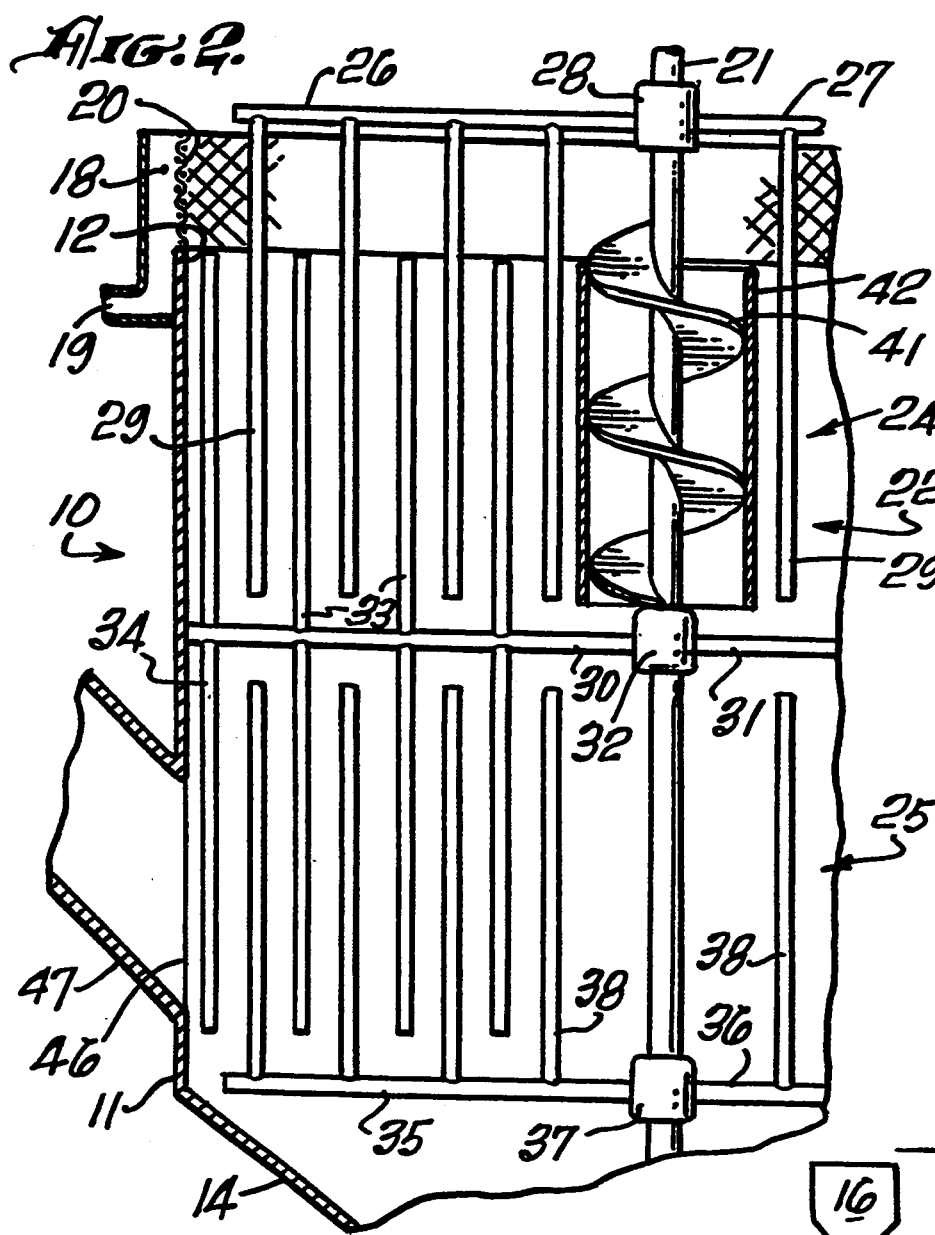
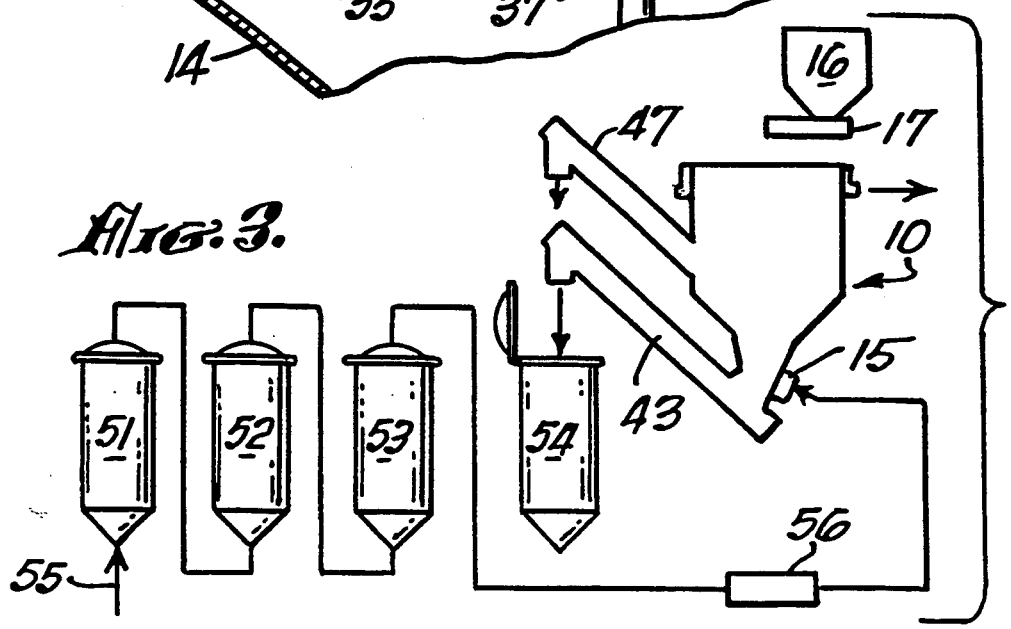

METHOD AND APPARATUS FOR TREATING GROUND ROASTED COFFEE

This invention relates to a method and apparatus for treating ground roasted coffee particles in the manufacture of soluble or "instant" coffee products. More particularly, the invention relates to a method and apparatus in which an aqueous liquid and ground roasted coffee particles are moved continuously and countercurrently through a treating zone in a manner which promotes contact between the liquid and the coffee particles to facilitate complete wetting of the coffee particles and, upon extended contact, extraction of soluble solids therefrom.

BACKGROUND OF THE INVENTION

Soluble coffee products are produced by extracting soluble coffee solids from ground roasted coffee with hot water., e.g., 150° C. to 180° C. The resulting extract is concentrated and dried, such as by spray drying or freeze drying, to provide soluble coffee powder. Extraction efficiency in such a manufacturing operation is influenced by a number of factors including grind of coffee, temperature of extraction water, prewetting of the ground coffee, design of extraction equipment and flow rate of extraction liquid through ground coffee particles.

Commercial production of soluble coffee products commonly is carried out in a counter-current cell extraction system in which hot water is introduced into one end of a plurality of extraction columns operated in series, with the water passing through one column to another and successively contacts progressively fresher coffee grounds. The last column contains the freshest (or least extracted) coffee grounds. Commercial cell extraction systems typically have from about 4 to 10 or more extraction columns, each one filled with a bed of roast and ground coffee. In such counter-current extraction systems, water entering the system at one end becomes progressively more concentrated with dissolved coffee solids as it contacts progressively fresher coffee grounds in successive columns. In commercial operations, roast and ground coffee, is filled into an extraction column and prewetted with extraction liquid, usually water or coffee extract. Prewetting of roasted ground coffee in an extraction system is known to provide a number of advantages, such as improving cup flavor and improving extraction efficiency. However, uniform prewetting of coffee particles is difficult to achieve using procedures which have been available heretofore. Non-uniform prewetting of the coffee particles causes large pressure drops across the extraction columns which may result in increased extraction cycle time and decreased yield. Also, coffee gases evolved upon contacting the coffee particles with water impede complete wetting of the coffee particles.

During coffee extraction in the system, coffee gases are also evolved upon contact of the ground coffee with extraction liquid, with the evolved coffee gases being trapped within the bulk mass of coffee grounds in the extraction column. In general, the trapped coffee gases exist in a foamy state and result in a general reduction in the efficiency of the coffee extraction operation. Thus, the presence of the foamy gases in the mass of coffee grounds in a column impedes the extraction process by preventing good contact between the extraction liquid and coffee grounds, increases flow resistance of the liquid through the coffee grounds, and significantly reduces the mass transfer coefficient between extraction liquid and coffee grounds. In addition, the trapped coffee gases cause the bulk coffee mass to float on the extraction liquid thereby impeding complete wetting of the coffee particles and preventing fully wetted particles from settling out of the coffee mass.

Due in large part to the inability to achieve uniform prewetting of coffee particles and to problems resulting from the generation of foamy coffee gases in the bulk mass of coffee grounds during extraction, attempts to develop procedures for the continuous countercurrent liquid phase extraction of ground roasted coffee have not been successful to date on a commercial scale.

SUMMARY OF THE INVENTION

The present invention is directed to a method and apparatus for uniformly prewetting and degassing roast and ground coffee for a coffee extraction system. In accordance with this invention, a bed of ground coffee particles is suspended in an aqueous liquid, typically water or coffee extract, in a treating zone, with the suspended bed being agitated in a manner which facilitates removal of evolved coffee gases from the bed of coffee particles to provide improved contact between the coffee particles and the aqueous liquid. The removal of evolved coffee gases from the suspended bed facilitates uniform prewetting of the coffee particles and enables fully wetted coffee grounds to settle through the suspended coffee mass. Fresh coffee particles are introduced onto the upper surface of the suspended bed, with wetted and extracted grounds being removed from the bottom of the treating zone thereby providing a truly continuous system. The coffee particles pass through the treating zone counter current to the aqueous liquid, which is introduced at the bottom of the treating zone.

The apparatus of this invention comprises a tank having inlet means at its base for introducing an aqueous liquid into the tank and a discharge channel at its upper end for removing extraction liquid from the tank. A filter screen mounted at the top of the tank before the discharge channel prevents coffee particles from being discharged with the extraction liquid. A coffee hopper and feed pipe are mounted above the open upper end of the tank for introducing ground roasted coffee into the upper end of the tank. The tank includes a vertically extending, centrally located shaft adapted to be rotationally driven, and stirring means arranged within the tank for agitating a suspended bed of coffee particles in the tank upon rotation of the shaft. The stirring means includes two pairs of vertically extending interleaved blade assemblies arranged for relatively counter rotating movement. Each pair of blade assemblies has a set of spaced apart downwardly extending blade members and an opposed set of spaced apart upwardly extending blade members, with one of the sets of blade members in both blade assemblies being mounted for rotational movement and the opposed set of blades in that assembly being mounted on a fixed support member. The blade members in each set are mounted in a planar array and in an interleaved arrangement with the blade members of the opposed set so as to pass through one another with clearance upon relative rotational movement. In this manner, the opposed sets of blade members function to break loose and channel away trapped coffee gases in the suspended bed of coffee particles in the tank. That is, the coffee particles in the suspended bed are abraded upon the relative counter rotation of the opposed sets of blade members to scrub off evolved coffee gases adsorbed onto the coffee particles. This relative counter rotation of the blade assemblies in the suspended bed also facilitates submerging and wetting of fresh grounds introduced into the suspended bed, and enhances dissolution of coffee solids.

An auger screw mounted on the upper section of the center shaft within a cylindrical pipe functions as a down-comer to promote submerging coffee particles in the aqueous medium.

Fully and uniformly wetted or extracted grounds pass by gravity from the suspended bed of coffee particles to the base of the tank where they are removed by an inclined helical screw conveyor mounted at the base of the tank for removal. A second inclined screw conveyor is mounted on the side of the tank intermediate its base and open upper end to remove wetted grounds from the base of the suspended bed and thereby control the height of the suspended bed of coffee particles in the tank.

In operation, a bed of roast and ground coffee particles suspended in an aqueous liquid is formed in the tank by pumping the aqueous liquid, such as hot water or coffee extract from a conventional cell extraction system, into the tank through an inlet at the bottom of the tank, with the liquid flowing upward through the tank and through the filter screen into the discharge channel at the top of the tank. Roast and ground coffee is discharged from the hopper onto the surface of the liquid and becomes partially wetted. The partially wetted grounds are submerged into the liquid by the relatively counter rotation of the vertically oriented blade assemblies. In addition, a portion of the grounds are swept into the central down-comer and submerged in the body of the liquid through the rotation of the central auger screw.

Roast and ground coffee grounds contain coffee gas. When the grounds are submerged in the aqueous liquid coffee gases are evolved, with the gases being adsorbed onto the exterior of the coffee particles. Due to the adsorption of coffee gases on the particles, the grounds are lighter than the liquid and tend to float to the top of the liquid thereby forming a naturally suspended bed of coffee particles. In the present invention, the coffee particles in the bed are abraded by the relative counter rotation of the blade assemblies to rub off and release the adsorbed coffee gases. In addition, the coffee gases thereby released are continually channeled away from the suspended particle bed by the rotation of the blade assemblies. That is, the relatively counter rotation of the vertically oriented interleaved blade members creates numerous dynamic vertical channels through the suspended bed of coffee particles through which evolved coffee gases escape, thereby providing increased contact between the coffee particles and the aqueous liquid. In addition to venting evolved gases, the dynamic vertical channels also provide passages for the wetted coffee particles to settle through the suspended bed.

When submerged into the bulk volume of the suspended coffee bed, the partially wetted coffee grounds become progressively wetted and partially or fully extracted, depending on the conditions of operation. The wetted grounds become heavier than the aqueous liquid and settle to the bottom of the tank where they are removed by the bottom screw conveyor. However, some of the wetted grounds settle out of the coffee bed at a relatively slow rate and are removed from the tank at an intermediate point to prevent their impeding the flow of particles which settle at a faster rate. These slower settling coffee particles are removed from the tank such as by an intermediate screw conveyor which is mounted on the tank at a point at the base of the suspended coffee bed. Thus, the intermediate conveyor serves to control the height of the suspended bed in the tank.

The process of this invention may be utilized for prewetting roast and ground coffee used in a conventional cell extraction system and provides coffee particles which are thoroughly and uniformly prewetted. The prewetted coffee particles thus obtained may be loaded into an extraction column in a counter-current cell extraction system. In accordance with another embodiment, the process, with suitable adjustments such as increasing the height of the suspended bed, increasing the residence time of grounds in the tank, and increasing the amount of liquid removed in relation to the amount of coffee grounds introduced into the tank, may be used for the continuous countercurrent extraction of roast and ground coffee. Such adjustments will be readily apparent to and can be easily made by those skilled in the art.

BRIEF DESCRIPTION OF THE DRAWINGS

FIG. 2 is an enlarged partial section of the upper portion of the apparatus of FIG. 1.

FIG. 3 diagramatically illustrates a cell extraction system in which the roast and ground coffee to be extracted is prewetted by the process and apparatus of this invention.

DETAILED DESCRIPTION OF THE INVENTION

Figure 1:
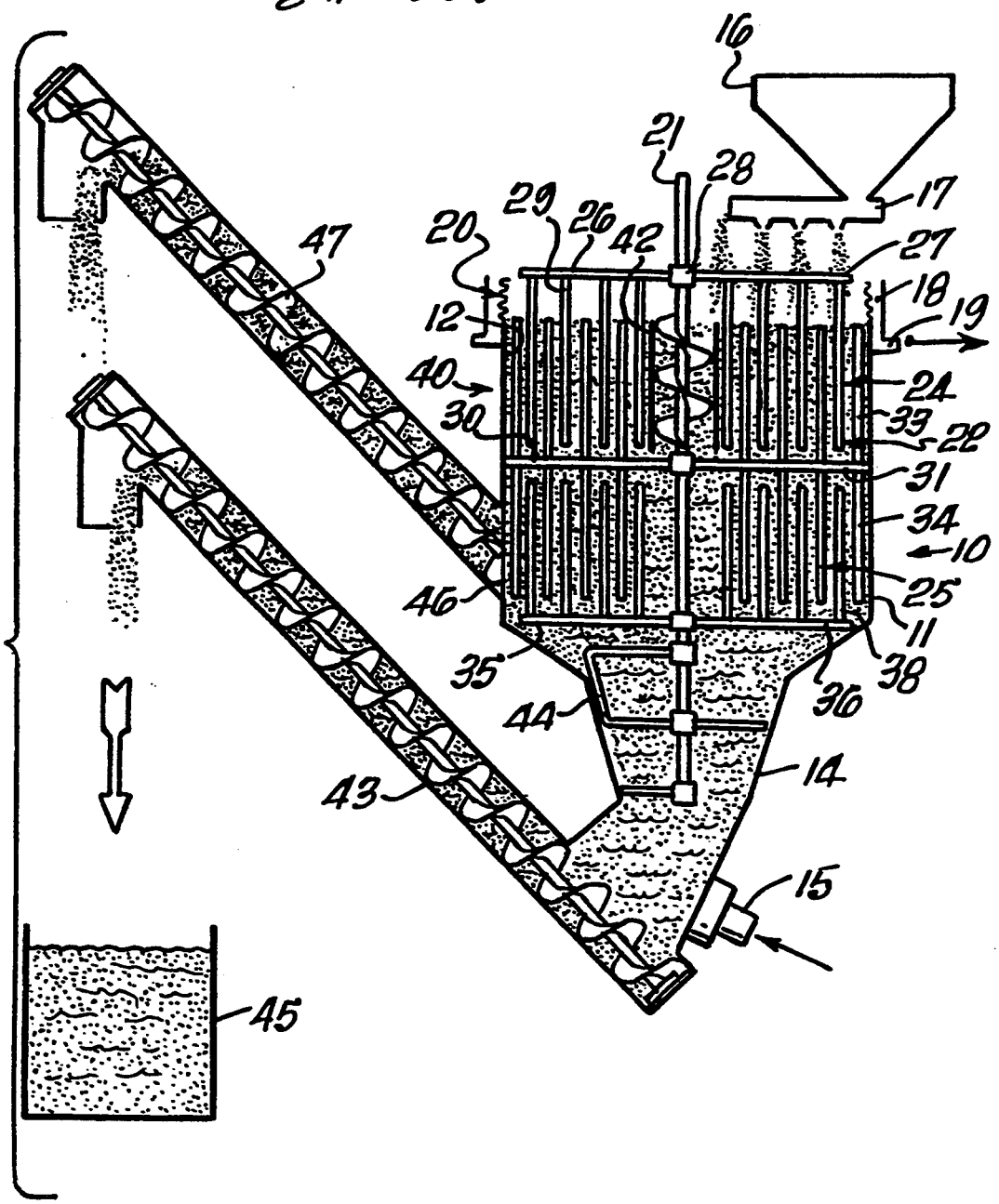
FIG. 1 is a sectional view of the apparatus of the present invention.

Referring to FIG. 1, the apparatus of the present invention comprises a treating tank 10 having a cylindrical shell 11 which is open at its upper end 12 and has a frusto-conical base 14. Hot water or other aqueous liquid, such as coffee extract from a conventional coffee extraction system, is pumped into the tank through inlet pipe 15 in the base of the tank and fills the tank. The liquid is discharged from the tank by overflowing the upper edge, and passes into a channel 18 surrounding the upper end of the tank. One or more draw-off lines 19 are provided in channel 18 for removing the liquid. Filtering means, such as a wire mesh screen 20 typically 10–20 cm in height and having sieve openings of between about 0.150 to 1.0 mm, is mounted around the upper end 12 of cylindrical shell 11 around the perimeter thereof so that liquid discharged from the tank will flow through the screen and be filtered before being discharged into channel 18. The sieve openings in screen 20 are sufficiently small to prevent coffee particles from being discharged with the liquid. Mounted above the tank is a hopper 16 in which roast and ground coffee to be extracted is stored, with the hopper communicating with distributor pipe 17 through which ground coffee from the hopper is discharged. A plurality of spaced openings are provided in the surface of pipe 17 adjacent the tank through which roast and ground coffee is distributed as a semi-curtain onto the surface of the aqueous liquid in the tank.

The tank includes a vertically extending, centrally disposed shaft 21 adapted to be rotationally driven, with the shaft extending over substantially the entire axial length of the tank. The upper end of the shaft is connected to suitable motor means (not shown) for rotation. Stirring means 22 are mounted within the tank for stirring a bed of ground coffee particles suspended in the aqueous liquid in the tank. The stirring means 22 comprises two pairs of vertically oriented interleaved blade assemblies, that is, an upper blade assembly 24 and a lower blade assembly 25. Upper blade assembly 24 has a pair of upper radial arms 26, 27 extending substantially across the diameter of the tank, with the arms being secured to a central collar 28 which is rotationally fixed to the shaft 21. A plurality of blades 29 extend downwardly from the radial arms 26, 27. In the embodiment illustrated in FIGS. 1 and 2 there are a total of eight blades 29 disposed along the diameter of the tank, four blades being located on each side of shaft 21 in a substantially symmetrical pattern. Upper blade assembly 24 also includes a plurality of upwardly extending blades 33 secured at their base to fixed radial support members 30, 31 which extend across the diameter of the tank. The outer ends of the support members 30, 31 are fixed to the interior wall of the tank, with the inner ends of members 30, 31 being secured to bearing collar 32 through which shaft 21 extends. In the embodiment illustrated, there are four blades located on each side of shaft 21.

In accordance with a preferred embodiment, blades 29 and 33 are in the form of cylindrical rods which are secured at their base to the upper radial arms and the intermediate support members, respectively. In accordance with another embodiment, the blades 29 and 33 have a flat configuration and a rectangular cross-section, with the broad faces of the blades being disposed at right angles to a plane passing through the diameter of the tank and bisecting the broad faces of the blades.

Lower blade assembly 25 is substantially the mirror image of upper blade assembly 24 and includes a plurality of blades 34 extending downwardly from the lower surface of fixed support members 30, 31. The number, configuration, and arrangement of blades 34 is the same as blades 33 which are secured to the upper surface of support members 30, 31. Lower blade assembly 25 also includes a pair of lower radial arms 35, 36 extending across the diameter of the tank secured to a central collar 37 which is rotationally freed to shaft 21. A plurality of blades 38 extend upwardly from radial arms 35, 36, with the number, configuration, and arrangement of blades 38 being the same as blades 29.

Thus, the upwardly and downwardly extending blades in each of the blade assemblies 24, 25 provide an interleaved arrangement so that the blades pass through the space between adjoining blades in the opposed set of blades upon rotation of center shaft 21. That is, as shaft 21 is rotated, downwardly extending blades 29 mounted on radial arms 26, 27 pass between stationary blades 33 mounted on fixed support members 30, 31, and upwardly extending blades 38 mounted on radial arms 35, 36 pass between stationary blades 34 mounted on the fixed support members 30, 31. Thus, in each of the blade assemblies one arm of vertical blades is rotating and the other arm in the set is stationary. This arrangement provides the effect of relatively counter rotation which serves to break loose and submerge coffee grounds which are discharged from the hopper onto the surface of the liquid in the tank into the bed of suspended coffee grounds 40 in the tank. Such counter rotation of the blade assemblies in the suspended bed of coffee particles imposes an abrading action on the particles to rub off evolved coffee gases adsorbed on the surfaces of the particles, thereby increasing the contact between the liquid and the coffee particles and increasing the mass transfer coefficient between the liquid and the coffee particles. In addition, the counter rotation of the blade assemblies through the suspended bed creates a number of-dynamic vertical channels in the suspended coffee bed for the escape of coffee gases thus evolved. The dynamic vertical channels thus formed also provide paths for wetted coffee particles to settle through the suspended bed of particles.

To assist in submerging the grounds in the body of liquid, a submerging auger 41 is mounted on the upper section of the vertical shaft 21 within a vertically disposed stationary casing 42 which serves as a downcomer for the submerging coffee particles. In accordance with one embodiment, in the upper blade assembly 24, a vertical paddle (not shown) is secured to the blades 29 adjacent casing 42 to assist in driving some of the coffee grounds on the surface of the liquid into the down-comer, with the grounds being submerged into the bulk volume of the suspended bed through the rotation of auger 41.

Wetted coffee grounds settle by gravity to the bottom of the tank and are removed from the base 14 of the tank by inclined screw conveyor 43. Scrapers 44, mounted on center shaft 21 in base 14 assist-in sweeping wetted grounds into screw conveyor 43. The wetted coffee grounds are discharged from the upper end of the screw conveyor 43 into a suitable container 45.

An opening 46 is provided in cylindrical shell 11 adjacent the lower end of the shell at a point approximate the bottom of the suspended bed 40 of coffee particles in the tank, i.e., approximately 25 to 50 cm below the upper edge of the tank. An intermediate inclined screw conveyor 47 driven by conventional motor means (not shown) is secured to the tank at opening 46. Since a portion of the wetted coffee grounds settle out at a slower rate than others, the slower settling grounds are removed from the tank through opening 46 and are discharged from the upper end of screw conveyor 47 into container 45. The removal of a portion of the coffee grounds by intermediate screw conveyor 47 also serves to control the height of the suspended bed at a predetermined desired level.

In operation, aqueous liquid such as water having a temperature of about 15° to 100° C. is pumped into tank 10 through inlet pipe 15, with the water filling the tank and overflowing the upper end of the tank. The water overflowing the upper end of the tank passes through screen 20 into channel 18. Roast and ground coffee from hopper 16 is fed to distributor pipe 17 and discharged therefrom through a series of spaced openings in the pipe as a semi-curtain onto the liquid in the tank. The operation proceeds with the coffee particles and the water moving continuously and countercurrently through the tank. That is, the aqueous liquid which is continuously introduced at the base of the tank, passes upwardly through the tank, while roast and ground coffee particles are continuously introduced into the top of the tank and pass downwardly through the rising liquid. The central shaft 21 is rotated at a speed of about 20–40 r.p.m., effecting rotation of the interleaved upper and lower blade assemblies 24, 25 and central auger 41, all of which are mounted on shaft 21. Operating the unit to provide a draw-off ratio of about 0.2–0.25 is effective to fully and uniformly wet the coffee particles.

Coffee grounds discharged from the distributor pipe 17 are distributed on the top surface of the suspended coffee bed and become partially wetted. The partially wetted grounds are then submerged into the bulk volume of the suspended bed through rotation of the upper radial arms 26, 27 and the blades 29 attached thereto. The rotation of blades 29 also sweeps a portion of the grounds on the surface of the coffee bed into central down-comer 42 where they are carried by the rotation of the central auger 41 into the bulk volume of the suspended bed. When the coffee grounds are submerged in water, coffee gases are evolved with the gases being adsorbed on the surface of the coffee particles, thereby making the grounds lighter than the liquid so that they tend to float to the top of the tank, forming a naturally suspended bed. However, the presence of evolved gases in the coffee bed inhibits good contact between water and the coffee grounds and significantly reduces the mass transfer coefficient between water and coffee grounds, in addition to preventing the fully wetted coffee particles from settling to the bottom of the tank. The rotation of the blade assemblies through the bed of coffee particles provides a gentle massaging or abrading action which scrubs off the evolved gases which are attached to the coffee particles. In addition, the rotation of the upper and lower interleaved blade assemblies creates dynamic vertical channels through the bed of suspended particles through which evolved coffee gases escape. The dynamic vertical channels also provide paths for wetted coffee particles to settle through the suspended bed.

The coffee particles will be substantially degassed and wetted after traveling through a suspended bed 25 to 50 cm in height in an average time of 4–10 minutes. The wetted particles being heavier than the water settle to the bottom of the tank and are removed from the tank by screw conveyor 47. The coffee particles thus removed are fully and uniformly Wetted and may be transferred to any conventional coffee extraction system. Since the coffee particles are fully and uniformly wetted, objectionable pressure drops in the extraction cells are avoided.

The apparatus of this invention may also be used as a continuous counter current coffee extractor. In using the unit as a continuous extractor, longer extraction times are required. Such longer extraction times may be provided by any suitable procedure and can be readily determined by those skilled in the art, such as for example by increasing the height of the suspended bed in the tank, increasing the draw-off ratio of coffee liquor to up to about 3.0, and the like. It will be recognized that the removal of evolved coffee gases from the surface of the coffee particles, which is effected by counter rotation of the blade assemblies through the suspended bed, enhances dissolution of coffee solids from the particles.

FIG. 3 illustrates an embodiment in which the present invention is used for prewetting roast and ground coffee which is subsequently extracted in a conventional cell extraction system. As shown therein, the extraction system comprises three extraction cells 51, 52, 53. Cell 51 contains the most intensively extracted coffee while cell 53 contains the least extracted coffee, the extractable level decreasing from cell 51 to cell 53. While only 3 cells are illustrated in FIG. 3, it will be understood that additional cells may, if desired be used in the extraction system. The extraction liquid 55 such as water is introduced into the bottom of cell 51, passes upward through the cell, picking up soluble products in the process, exits at the upper end of cell 51 and passes successively through each of the cells until it passes through cell 53 which is the last cell and which contains fresh wetted coffee particles. After each extraction Cycle, the cell containing the most intensively extracted coffee, i.e., cell 51, is emptied, and the leading cell 54 is filled with fresh wetted coffee particles and, after the cells have been suitably interconnected, another extraction cycle begins.

As shown in FIG. 3, coffee extract discharged from cell 53 is passed through a suitable cooling unit 56 in which the temperature of the coffee extract is reduced from about 100° C. to between about 15°–80° C. The cooled extract is then introduced into the base of tank 11 through inlet 15, with the aqueous extract moving through the tank counter current to the flow of coffee particles which are discharged into the top of the tank from hopper 16 and distributor pipe 17. Tank 11 is operated under conditions which fully wet the roast and ground coffee particles, with the wetted particles being discharged from tank 15 by screw conveyors 43 and 47 and loaded into cell 54.

For a tank 11 which has a diameter of about 74 cm the following tank conditions are effective in fully wetting roast and ground coffee particles.

| | |
|---|---|
| Height of suspended coffee bed | 30 cm |
| R&G coffee feed rate | 360 Kg. per hr. |
| Inlet water rate | 720 Kg. per hr. |
| Rotational speed of center shaft, central auger, blade assemblies | 20–40 r.p.m. |
| Draw-off of coffee liquor | 80–85 Kg. per hr. |
| Average wetting time | 4–5 min. |

Most of the upwardly flowing extract is absorbed into the coffee grounds, with a small portion of extract becoming progressively enriched in extractable coffee solids.

The liquor which passes through the tank and overflows into channel 18 is withdrawn therefrom for further processing, such as by concentration, freeze drying or spray drying of the liquor.

What is claimed is:

1. A process for the continuous counter current treatment of roast and ground coffee which comprises
    continuously introducing an aqueous liquid into the base of a treating tank so as to fill said tank, with the liquid rising through the tank and being discharged from the open upper end of the tank,
    continuously introducing roast and ground coffee particles onto the surface of the aqueous liquid in said tank,
    submerging the coffee particles into the aqueous liquid to form a bed of coffee particles suspended in said aqueous liquid whereby the coffee particles are wetted and gases are evolved from the wetted coffee particles and adsorbed onto said particles,
    subjecting the suspended bed of coffee particles to relative counter rotation to remove the evolved gases adsorbed on the coffee particles and form dynamic vertical channels through said suspended bed for the escape of the coffee gases removed from the coffee particles,
    controlling the height of the suspended bed by continuously removing a predetermined amount of coffee particles from the base of the suspended bed,
    continuously removing wetted coffee particles from the base of the treating tank, and recovering the aqueous liquid which overflows the upper end of the tank.

2. The process defined in claim 1 in which the height of the suspended bed is controlled by removing particles from the base of the bed so that the particles are maintained in contact with the liquid for a period of time sufficient to fully wet the particles, with the fully wetted coffee particles being recovered from the base of the tank.

3. The process defined in claim 2 in which the height of the suspended bed is about 25 cm to 50 cm and the coffee particles are maintained in contact with the liquid in the tank for a period of about 4 to 10 minutes.

4. The process defined in claim 3 in which the feed rates of the coffee particles and aqueous liquid to the tank are controlled to provide a draw-off ratio of 0.2–0.25.

5. The process defined in claim 2 in which the fully wetted coffee particles recovered from the tank are transferred to the lead cell in a multi-cell coffee extraction system.

6. The process defined in claim 1 in which the height of the suspended bed is controlled to maintain the particles in contact with the liquid in the tank for a period of time sufficient to extract soluble coffee solids from the particles, with extracted coffee grounds being removed from the base of the tank and coffee extract being recovered from the upper end of the tank.

7. The process defined in claim 1 which includes passing the liquid being discharged from the tank through a screen having openings sufficiently small to retain substantially all of the coffee particles in the tank.

8. In a counter current coffee extraction process wherein coffee material to be extracted is contained in a plurality of extraction cells interconnected in series and wherein a cell containing the least extracted coffee material to be extracted is positioned downstream, with respect to the flow of extraction liquid, from a cell containing coffee material which is most extracted, the improvement which comprises
   introducing into the cell containing the least extracted coffee material roast and ground coffee particles which have been substantially uniformly wetted by the process comprising
      forming a suspended bed of roast and ground coffee particles in an aqueous liquid,
      subjecting the suspended bed of coffee particles to relative counter rotation to form dynamic vertical channels through said bed through which gases which are evolved from the coffee particles are removed from the suspended bed,
      maintaining the coffee particles in contact with the aqueous liquid for a time sufficient to fully wet the coffee particles, with the particles being substantially uniformly wetted, and
      removing the wetted coffee particles from the suspended bed and introducing the substantially uniformly wetted particles into said extraction cell
whereby objectionable pressure drop across the extraction cells is substantially reduced.

9. The process according to claim 8 wherein the aqueous liquid with which the suspended bed of coffee particles is formed comprises the extraction liquid from the cell containing the least extracted coffee material.

* * * * *